United States Patent [19]

Priem

[11] Patent Number: 5,768,628
[45] Date of Patent: Jun. 16, 1998

[54] METHOD FOR PROVIDING HIGH QUALITY AUDIO BY STORING WAVE TABLES IN SYSTEM MEMORY AND HAVING A DMA CONTROLLER ON THE SOUND CARD FOR TRANSFERRING THE WAVE TABLES

[75] Inventor: Curtis Priem, Fremont, Calif.

[73] Assignee: Nvidia Corporation, Sunnyvale, Calif.

[21] Appl. No.: 422,994

[22] Filed: Apr. 14, 1995

[51] Int. Cl.[6] .......................................... G06F 13/00
[52] U.S. Cl. .................. 395/882; 395/309; 395/821; 395/846; 395/823
[58] Field of Search .......................... 395/842, 473, 395/822, 821, 823, 846, 882, 309, 310, 439; 84/622, 714; 371/51.1; 348/719

[56] References Cited

U.S. PATENT DOCUMENTS

| | | | |
|---|---|---|---|
| 4,573,140 | 2/1986 | Szeto | 395/310 |
| 4,991,487 | 2/1991 | Yamaguchi | 84/714 |
| 5,376,752 | 12/1994 | Limberis et al. | 84/622 |
| 5,497,476 | 3/1996 | Oldfield et al. | 395/439 |
| 5,499,384 | 3/1996 | Lentz et al. | 395/821 |
| 5,524,208 | 6/1996 | Finch et al. | 395/183.01 |
| 5,542,053 | 7/1996 | Bland et al. | 395/309 |
| 5,546,137 | 8/1996 | Takeuchi | 348/714 |
| 5,551,006 | 8/1996 | Kulkarni | 395/473 |
| 5,561,672 | 10/1996 | Kaneko | 371/51.1 |
| 5,585,864 | 12/1996 | Takeuchi | 348/719 |
| 5,598,576 | 1/1997 | Hsu et al. | 395/822 |

*Primary Examiner*—Thomas C. Lee
*Assistant Examiner*—Po C. Huang
*Attorney, Agent, or Firm*—Stephen L. King

[57] ABSTRACT

An arrangement which utilizes the system memory to store the wave tables used in the generation of high quality sound, and a direct memory access controller to rapidly transfer the portions of the wave tables stored in memory using the system bus so that a sound card may manipulate high quality sounds from wave tables stored directly in system memory without overloading the system bus and without the need for substantial additional memory on the sound card.

8 Claims, 4 Drawing Sheets

METHOD FOR PROVIDING HIGH QUALITY AUDIO BY STORING WAVE TABLES IN SYSTEM MEMORY AND HAVING A DMA CONTROLLER ON THE SOUND CARD FOR TRANSFERRING THE WAVE TABLES

BACKGROUND OF THE INVENTION

1. Field of the Invention

This invention relates to computer systems, and more particularly, to methods and apparatus for providing advanced audio in such systems.

2. History of the Prior Art

A substantial amount of development is presently being directed to providing additional features to personal computers so that they may be utilized as centers of communication and information rather than simply as work stations for individual operators. A great portion of this development is directed toward including features such as sound and video already found in other forms of electronic circuitry.

Until very recently, the sound capabilities of personal computers have been very limited. The personal computer was not originally conceived as including an advanced sound system because of the very extensive amount of data which must be transferred in such a sound system. The personal computer with its relatively narrow bus bandwidth was not adapted to provide this transfer rate. This is particularly true with computer systems running multiprocessing operating systems in which the computer bus bandwidth is generally expected to be used simultaneously by a number of different programs. Thus, the sounds computers were originally adapted to provide were, in general, only intended to alert the operator to some action having been completed by the computer or needing attention by the operator.

The original and still most common system bus for the personal computer is called the industry standard (ISA) bus. The ISA bus is narrow and slow. It is able to transfer only sixteen bits of data simultaneously and functions at a maximum clock frequency of eight megahertz. The ISA bus is capable of transferring data at a sustained rate of approximately four megabytes per second.

The earliest feasible technique of producing sound electronically is called FM synthesis. This technique involves generating a tone at a frequency used by an instrument. Low quality sound boards used FM synthesis to provide a single (or a few) frequencies to emulate an instrument. When a basic tone is combined with various overtones which are typically generated by a particular instrument, a sound is produced which may be distinguished as that of a particular instrument but which is often unacceptable to audiophiles. This method of producing sound is still used in inexpensive computer sound systems.

A better method used to produce higher quality sound utilizes what are referred to as wave tables. A wave table is generated by sampling a sound from an instrument, storing that complex sound in memory, and then repeating the sound stored at different frequencies to make all the notes of the instrument. In order to obtain more accurate sounds for an instrument, a number of samples are taken at different frequencies and then combined by a sound generation controller to produce the notes between the sampled frequencies. The more samples of the sound which are used for any instrument, the better the sound quality produced. The sound generation controller is used to rate convert the samples and play the sounds in a pattern provided by a central processing unit (CPU). The pattern typically designates the pitch, attack rate, and decay rate of the various notes for each instrument, the sequence of notes, and various recognizable modulations such as tremolo, and specifies the various instruments which are to be added together to produce the sounds. For example, an orchestra may include fifty or more instruments playing at once. The result is that if more memory is used, better results are produced.

As has been pointed out, the ISA bus is capable of transferring approximately four megabytes of data per second. On the other hand, to generate high quality audio for a number instruments requires the transfer of approximately the same amount of data. Thus, if the CPU and the system bus are used in order to carry out the sound generation in a multiprocessing system, carrying out the other functions of the computer including running other application programs becomes impossible. Consequently, additional memory has always been added to the computer and positioned with a sound generation controller on a peripheral sound board in order to handle the generation and manipulation of sound using wave tables.

Wave table sound boards are typically implemented by putting a significant amount of memory on a sound board along with the sound generation controller. Inexpensive wave table sound boards often use read only memory (ROM) to store sounds on the sound board which are simply played by the board controller. Higher quality wave table sound boards utilize random access memory (RAM) to store sounds so that the sounds can be varied to meet the user's needs. Thus, low quality wave table sound boards often have one megabyte of storage while high quality wave table sound boards may use up to four megabytes of RAM.

Thus, for high quality sound, a large amount (e.g., four megabytes) of RAM is positioned on a wave table sound board so that the bus is not involved in the sound generation. Then, when the sound program starts, the CPU moves the signals representing the wave table sounds to the RAM on the sound board; and the sound generation controller manipulates the sound stored by the local RAM on the sound board. After the CPU moves the wave table sound data to the memory on the sound board using the system bus, neither the CPU or the bus is involved in the operation of generating sound except for providing the notes, the note sequences, and the combinations of instruments to be produced. However, the four extra megabytes of RAM on a sound board costs the user about one hundred and fifty dollars at present. Moreover, a sound board has a fixed amount of memory which can be used in generating sounds, an amount which may be insufficient for many purposes.

It is desirable to be able to produce high quality sound in a personal computer system without the added cost of memory normally attendant on such production. Moreover, it is desirable to be able to produce any number of individual sounds simultaneously without the need to increase the memory available on a sound board.

SUMMARY OF THE INVENTION

It is, therefore, an object of the present invention to provide improved apparatus and a method for providing high quality sound in a personal computer.

It is another object of the present invention to increase the ability of a personal computer to handle the data used in producing high quality sound.

These and other objects of the present invention are realized in an arrangement which provides means for utilizing the system memory to store sounds used in wave table generation of high quality sound, and means to rapidly transfer the sounds stored in memory using the system bus so that a sound card may manipulate high quality sounds stored directly in system memory without overloading the system bus and without the need for substantial additional memory on the sound card.

These and other objects and features of the invention will be better understood by reference to the detailed description which follows taken together with the drawings in which like elements are referred to by like designations throughout the several views.

NOTATION AND NOMENCLATURE

Some portions of the detailed descriptions which follow are presented in terms of symbolic representations of operations on data bits within a computer memory. These descriptions and representations are the means used by those skilled in the data processing arts to most effectively convey the substance of their work to others skilled in the art. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing the operations of the present invention include general purpose digital computers or other similar devices. In all cases the distinction between the method operations in operating a computer and the method of computation itself should be borne in mind. The present invention relates to a method and apparatus for operating a computer in processing electrical or other (e.g. mechanical, chemical) physical signals to generate other desired physical signals.

DETAILED DESCRIPTION

Figure 1:
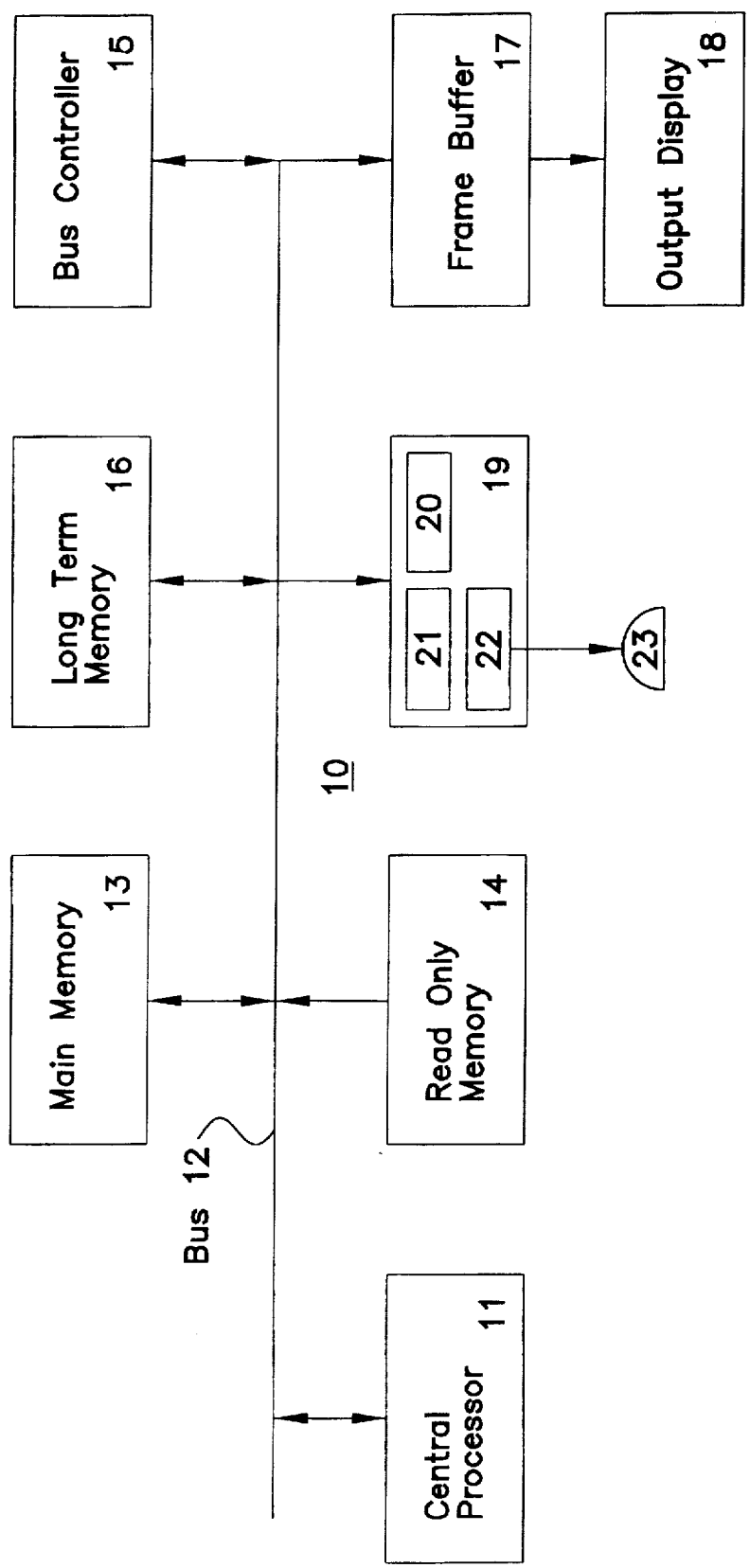
FIG. 1 is a block diagram of a computer system designed in accordance with the teachings of the prior art to provide high quality audio output.

Referring now to FIG. 1, there is illustrated a block diagram of a computer system configured in accordance with the teaching of the prior art. A portion of such a system 10 includes a central processing unit 11 which executes the various instructions provided to control the operations of the system 10. The central processing unit 11 is joined to a bus 12 adapted to carry information between the various components of the system 10. Typically the bus 12 used in a personal computer is an ISA bus having its limiting characteristics although other buses may be used but will typically exhibit the same difficulties. Joined to the bus 12 is main memory 13 which is typically constructed of dynamic random access memory arranged in a manner well known to those skilled in the prior art to store information during a period in which power is provided to the system 10.

Also connected to the bus 12 are various peripheral components such as long term memory 16 and circuitry such as a frame buffer 17 to which data may be written which is to be transferred to an output device such as a monitor 18 for display. A bus controller 15 controls access to the bus 12 by the various components joined thereto.

A sound card 19 is also positioned as a peripheral on the bus 12. The sound card 19 typically includes a sound generation controller 20, random access memory (RAM) 21, and a digital-to-analog converter circuit (CODEC) 22. Wave tables are transferred from long term memory 16 to the RAM 21 under control of the CPU 11. The sound generation controller 20 functions in response to commands from the CPU 11 to use the sound patterns stored in the wave tables to generate and combine the sounds in sequences determined by the CPU 11. The sound card 19 is connected to provide output directly to an audio output device such as speakers 23 through the CODEC 22.

Sound cards were originally designed to function with the ISA bus since IBM personal computers were originally designed with that bus. A sound card 19 positioned as a peripheral on the ISA bus receives the wave tables transferred by the CPU 11 from long term memory 16 and stores those wave tables in RAM 21 on the sound board. This operation places the data directly adjacent to the sound generation controller 20 so that manipulations of the data in the wave tables do not require that the data be transferred over the bus 12. The transfer of the data to be manipulated over the bus 12 during the synthesis of the sounds has been felt to be especially undesirable and probably impossible because personal computer buses are so narrow and are subject to constant interruption in a system which accomplishes multiprocessing. In view of the fact that the transfer of sound data to the output (e.g., speakers 23) cannot be interrupted without causing the serious degeneration of the sound output signals, the use of the bus for this purpose has been seriously opposed.

In fact, with personal computers, the arrangement of the sound board as a peripheral with its own memory and its own output to local speakers or earphones is specifically intended to overcome the drastic lack of bandwidth of an operating multiprocessing system. The transfer of the amount of data required to produce the output from an orchestra may be as much as four megabytes per second. This is approximately the total bandwidth of the ISA bus. Consequently, sound boards on the ISA bus have always been positioned with enough memory to function without relying on the bus.

To date, sound boards have not been positioned on the PCI or other local bus because the facilities of the bus system do not provide a sufficient number of slots to allow a sound card and the inexpensive way to design such a card is to use circuitry designed for the ISA bus. This would provide no speed advantage over ISA sound cards yet cost more because of the need to design a local bus interface. Moreover, the system transfer facilities are interruptable and cannot be utilized in any operation which requires the appearance of real time operation at the output.

However, as has been mentioned, a problem that expensive sound cards have is that they take a large amount of memory to store the sound waves that they use to make the ultimate sounds that are produced. Memory is expensive. Four megabytes of dram costs about one hundred and fifty dollars at retail.

The present invention has application in any system utilizing high quality sound produced by a sound board, such as a computer system. The present invention is especially useful in a personal computer system having a local bus architecture such as the personal computer interface (PCI) bus designed and manufactured by Intel Corporation or the VESA local bus. Such systems provide a wider bus, typically thirty-two or sixty-four bits, which is more closely associated with the central processing unit of the system and consequently is able to transfer data at a more rapid rate than in the ISA bus.

Figure 2:
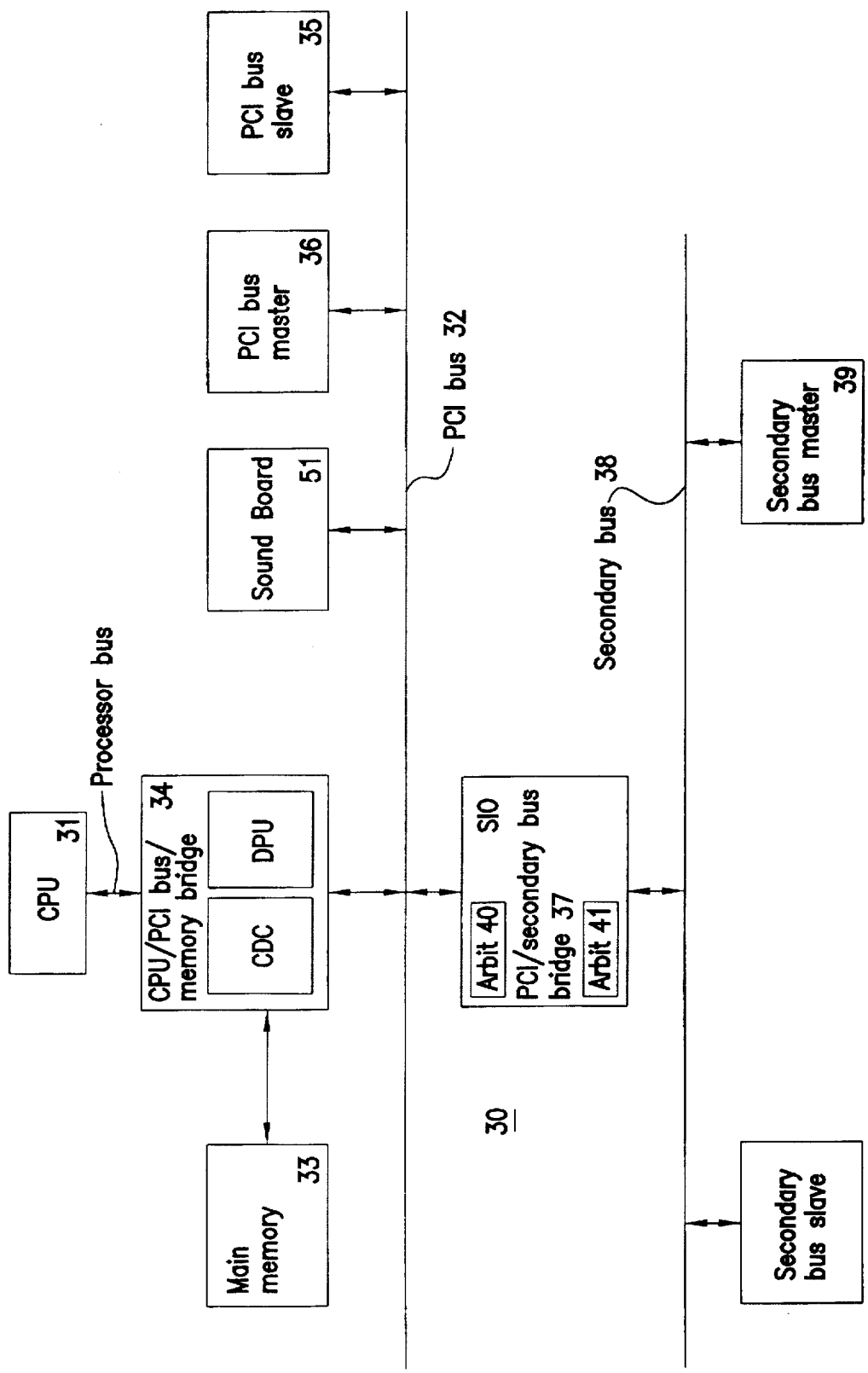
FIG. 2 is a block diagram of a computer system which may utilize the present invention.

FIG. 2 illustrates a computer system 30 designed with a PCI bus architecture. The system 30 includes a central processor 31 such as an Intel i486 microprocessor which carries out the various instructions provided to the computer 30 for its operations. The central processor 31 is joined to a bus 32 adapted to carry information to various components of the system 30. The bus 32 is designed as a PCI bus in order to allow the transfer of data to and from the central processor 31 at a rate faster than is possible utilizing the typical ISA or EISA buses used by the prior art. The processor 31 is joined to the bus 32 by a bridge circuit 34 which is adapted to provide various functions necessary to the transfer. Also joined to the PCI bus 32 by the bridge circuit 34 is main memory 33 which is typically constructed of dynamic random access memory arranged in a manner well known to those skilled in the prior art to store information during a period in which power is provided to the system 30. The particular bridge circuit 34 is physically constructed to include both a cache and dram controller (CDC) chip and a data path unit (DPU) chip each of which is manufactured by Intel Corporation of Santa Clara, Calif., although other bridge circuits designed in accordance with the PCI specification would function as well. Detailed descriptions of the Intel chips are provided in *Cache & DRAM Controller (CDC) 82424TX* and *Data Path Unit (DPU) 82423TX*, each published by Intel Corporation. In addition to various functions such as cache control and data synchronization, the bridge circuit 34 includes circuitry for controlling and accomplishing the transfer of data among the CPU 31, main memory 33, and the PCI bus 32.

The PCI bus 32 provides access to components associated therewith such as a PCI bus slave circuit 35 which may be a video output card which includes a frame buffer adapted to store video signals to be transferred to an output device such as a monitor for display. A PCI bus master circuit 36 may also be connected to the PCI bus 32. The main properties of a PCI bus master are that it includes a bus controller which functions at some internal clock rate and that it may initiate and control operations on the PCI bus 32.

Also connected to the PCI bus 32 is a PCI/secondary bus bridge circuit 37. The bridge circuit 37 performs the various functions necessary to transfer data between the PCI bus 32 and various component circuits joined to a secondary bus 38. The secondary bus 38 may be an ISA bus or a EISA bus either of which operates at a slower data transfer rate than the PCI bus 32. A specific PCI to ISA bus bridge circuit 37 is a part of an integrated circuit chip referred to as a "system input/output" (SIO) circuit manufactured by Intel Corporation; other bridge circuits designed in accordance with the PCI specification would function as well. Such a bridge is described in detail in a publication entitled *82420/82430 PCIset ISA and EISA Bridges*, published by Intel Corporation. Such a bridge circuit 37 includes circuitry for providing the interface between the PCI bus 32 and the secondary bus 38 which allows data to be transferred therebetween. The bridge circuit 37 provides circuitry which allows it to operate as an intercoupling bus master or as a bus slave on the PCI bus 32. The ability of the bridge circuit 37 to act as a PCI bus master allows a bus master circuit 39 positioned on the secondary bus 38 (for example, a local area network circuitry) to gain access to the PCI bus 32 and thence to the main memory. The SIO chip which includes the bridge circuit 37 also includes a first arbiter circuit 40 for controlling access to the PCI bus 32 and a second arbiter circuit 41 for controlling access to the secondary bus 38.

It might be possible to connect a sound card constructed in accordance with the teachings of the prior art in the position of the PCI slave circuit 35 illustrated in FIG. 2 although this has not been done to date. So positioned, a sound card would be able be provide operation in the same manner as a sound output card positioned on the ISA bus. Unfortunately, a bus slave PCI card is limited in a number of ways so that it cannot make a great deal of use of the broader bandwidth of the PCI bus. A PCI sound card arranged as a bus slave would have to utilize the same architecture as sound cards positioned on the secondary ISA bus. That is, such a card would need to include a substantial memory capable of storing all of the sound wave tables in order to accomplish its purpose. This would offer no advantage over present sound cards positioned on the ISA bus.

The present invention does not, however, position a sound card as a bus slave on the PCI bus 32. The PCI bus 32 is adapted to transfer data at various rates up to 120 megabytes per second in burst transfer mode. In standard transfers, a sustained rate of 33 megabytes per second may be attained. The VL bus functions at a similar rate; consequently, any system bus, such as the PCI or VL bus, which is adapted to transfer data at a relatively high speed is appropriate for use with the present invention. As was pointed out, joined to the bridge circuit 34 is main system memory 33 which in modern personal computers may provide from a minimum of typically four megabytes to sixteen, thirty-two, sixty-four or more megabytes of random access memory.

Also joined to the system bus 32 is a sound board 51 adapted to function in accordance with the present invention. The sound board 51 is provided in accordance with the facilities of the particular system bus as a bus master on that bus rather than a bus slave. More particularly, the sound board 51 has facilities for controlling the transfer of data on the local bus 32. By providing facilities on the sound board 51 to enable it to function as a bus master, the sound board 51 may write to main memory data which might otherwise require a read operation by the CPU 31. In this manner, transfers of data on the local bus 32 may take place as rapidly as is allowed by that bus. In the case of a PCI bus, this may be at a rate which approaches 120 megabytes per second in burst transfer mode.

Figure 3:
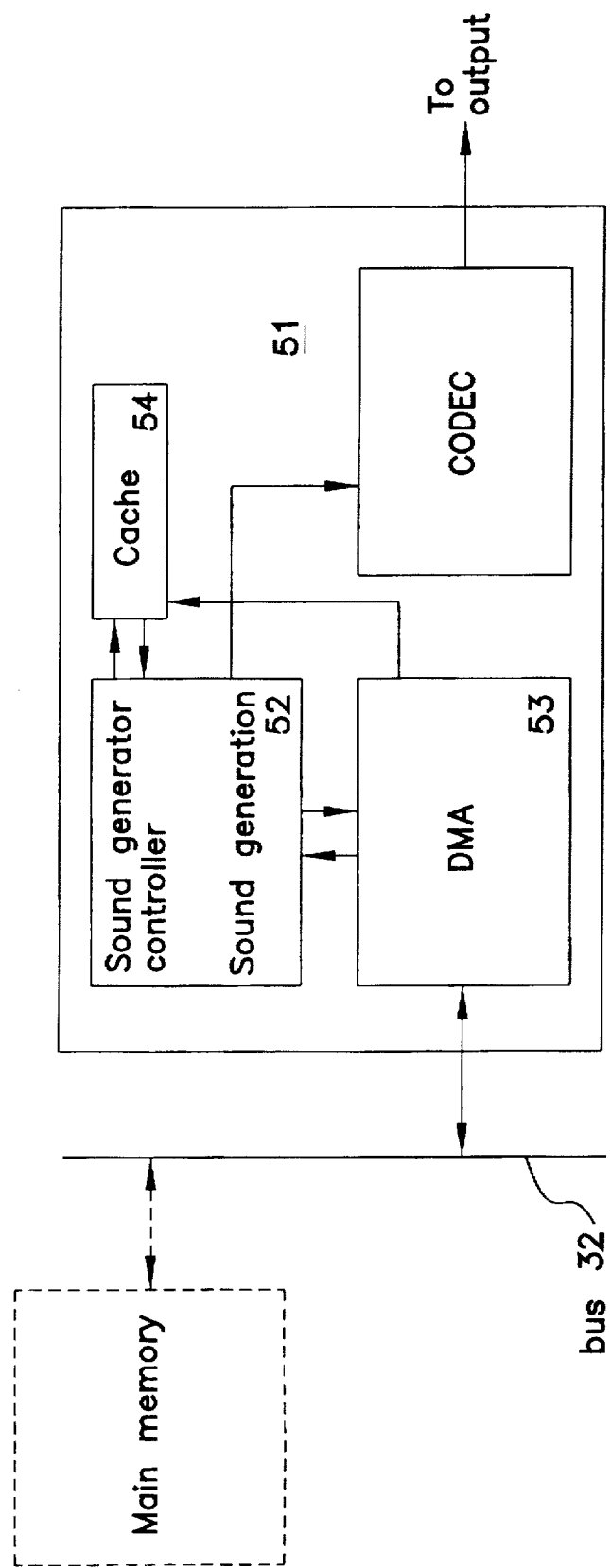
FIG. 3 is a block diagram of a portion of a personal computer system designed in accordance with the present invention.
Figure 4:
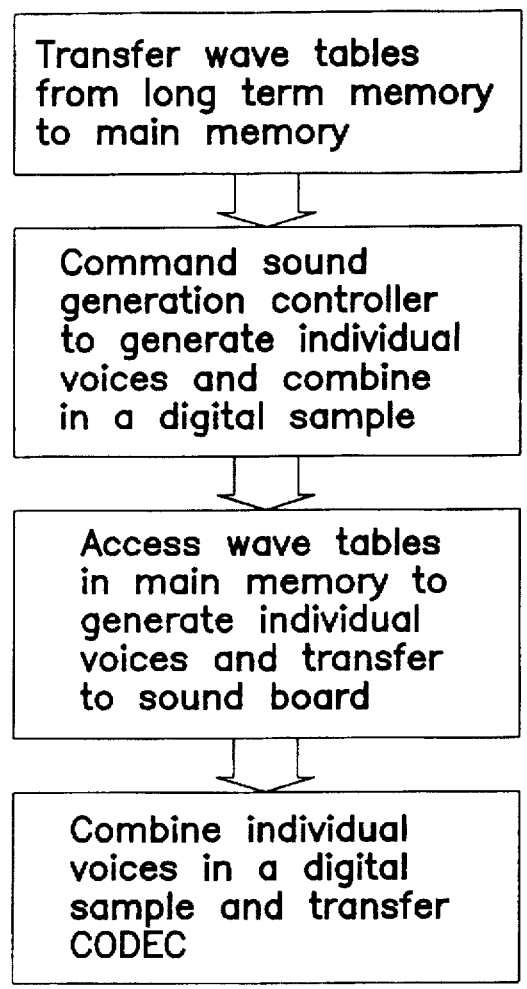
FIG. 4 is a flow chart illustrating the operation of the present invention illustrated in FIGS. 2 and 3.

FIG. 3 illustrates a block diagram of a circuit of a sound board 51 designed in accordance with the present invention. The sound board 51 includes a sound generation controller 52, a cache memory 54, and a direct memory access controller 53 which is particularly adapted to control transfer of data on the bus 32. The sound generation controller 52 functions in a manner known to the prior art to respond to commands from the CPU 31 to generate the individual notes of particular instruments from the sound wave tables and to combine those notes in response to CPU commands in a manner to produce the desired sounds.

The DMA controller 53 may be of a type well known in the art which is adapted to transfer data at a particular address and of a particular quantity to another particular address or another series of particular addresses. The DMA controller 53 may also include more advanced facilities for conducting operations such as scatter/gather operations and the like by which data may be transferred to different addresses without any need to refer to the CPU 31.

In contrast to the prior art arrangements, the present invention stores the sound wave tables from which the sounds are generated in main memory 33. With the wave tables stored in main memory, unlimited space for the tables is provided in contrast to the storage space provided by the RAM normally provided on a sound board. More importantly, no additional RAM is required on the sound board except that in one embodiment the cache memory 54 is provided to facilitate burst transfers on the PCI bus 32.

The circuit of FIG. 3 functions in the following manner is utilizing the sound board 51. When sounds are to be generated, the program running on the CPU 31 controlling the generation of sounds first reads the wave tables in long term memory which are to be used in the generation of a digital sample and writes those wave tables to main memory 33. With the wave tables stored in main memory, the program controlling the generation of sounds causes the CPU 31 to command the sound generation controller 52 to generate each of several simultaneous voices. The command for each voice provides to the sound generation controller 52 the storage location (address) of the wave table to be played for the voice and the parameters to be used to play the voice. The wave table for a voice consists of a series of digital samples of a sound used as the basis for a voice. The parameters to play the voice typically include the frequency (pitch) of the sound to be generated from the wave table, the envelope (attack/sustain/decay) describing the amplitude of the sound through time, and a tremolo to modulate the frequency.

The sound generation controller 52 generates digital samples at a fixed frequency and supplies those samples to the CODEC where they are converted into an analog output. Each time the sound generation controller 52 generates a new digital sample, it computes the contributions that each voice which it has been commanded to play contributes to the sample. It combines the contribution of each of the voices to produce the single output sample value. For each voice, the sound generation controller 52 uses the frequency, the current time, and other parameters to compute which of the samples for that voice affects the output. It then uses the current time and the envelope parameters to compute the volume of the voice.

In transferring the storage location to the sound generation controller 52, the CPU 31 transfers the addresses of the wave tables in main memory to the sound board. The sound generation controller 52 initiates operations to accomplish the generation of the sounds in response to the commands from the CPU 31 utilizing the addresses of the sound wave tables transferred to it. Those addresses are, in contrast to the addresses used in prior art sound generation controllers, addresses in main memory. The commands of the sound generation controller 52 directed to operate upon the data stored in the wave tables are transferred to the DMA controller 53 which accesses and reads the data in the wave tables at the addresses indicated as that data is needed by the sound generation controller 52 for generation of the voices.

In one embodiment of the invention, the sound generation controller 52 may utilize the local cache memory 54 to store data needed for the synthesis of sounds from the wave tables. The cache memory 54 may be utilized by the DMA controller 53 in order to allow burst transfers on the bus. Instead of using the DMA controller 53 to transfer the wave table data as each output sample is generated, the sound generation controller 52 may cause the DMA controller 53 to access a DMA burst size of data and store the excess in the cache memory 54. The sound generation controller 52 may then read the wave table data from the cache 54 rather than from main memory until the data in the cache is exhausted.

As will be obvious to those skilled in the art, the arrangement of the present invention provides all of the benefits of a typical sound card while eliminating the need to include a substantial amount of RAM on the sound board to hold wave tables. Moreover, in the present arrangement, essentially unlimited memory space is provided which may be used by the sound board for storing any number of wave tables in contrast to present sound board arrangements. By utilizing a DMA controller which is associated directly with the sound generation controller and which is not subject to interruptions by other peripherals joined to the system bus, very rapid transfers may be accomplished. Data may thus be furnished from main memory at a transfer rate on the bus equivalent to the rate at which data is normally handled by the sound generation controller and, thus, sufficient to provide normal operation of the sound board card. It should be emphasized that by increasing the abilities of the DMA controller, additional speed may be attained. For example, a sophisticated DMA controller having the ability to conduct scatter/gather operations and to have direct access to the page tables of the memory controller so that data may be accessed in virtual memory is able to provide very fast transfer operations. By using a relatively small cache memory 54, all of the samples which are able to be transferred by the bus in burst mode operation may be accessed by the DMA and transferred at one time. This allows a number of sound samples (e.g., fifty) to be transferred and manipulated at once.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. A computer system comprising a central processing unit;

a system bus;

main memory; and a sound board, the sound board comprising a sound generation controller adapted to respond to commands from the central processing unit to generate sounds, output circuitry for receiving the sounds generated, and a direct access memory controller connected to respond to addresses provided by the sound generation controller to access wave tables in main memory and transfer data therefrom to the sound board for manipulation by the sound generation controller.

2. A computer system as claimed in claim 1 in which the sound board further comprises a cache memory arranged to store data transferred by the direct access memory controller.

3. A computer system as claimed in claim 1 in which the direct access memory controller incorporates facilities for conducting scatter/gather operations.

4. A sound generation system for a computer system having a central processing unit, a system bus, and main memory comprising a sound generation controller adapted to respond to commands from the central processing unit to generate sounds, output circuitry for receiving the sounds generated, and a direct access memory controller connected to respond to addresses provided by the sound generation controller to access wave tables in main memory and transfer data therefrom to the sound board for manipulation by the sound generation controller.

5. A sound generation system as claimed in claim 4 in which the sound board further comprises a cache memory arranged to store data transferred by the direct access memory controller.

6. A sound generation system as claimed in claim 4 in which the direct access memory controller incorporates facilities for conducting scatter/ gather operations.

7. A method of generating sound from wave tables stored in long term memory comprising the steps of:

reading from long term memory and writing to main memory wave tables for voices designated by a command to generate a digital sample, generating individual voices from the wave tables stored in main memory under control of a sound generation controller positioned on a sound card connected to a local bus, comprising the steps of reading portions of the wave tables designated by the command using a direct memory access controller positioned on the sound board, and transferring the portions to the sound generation controller for the generation of individual voices, and combining the individual voices to provide a digital sample at the sound board for transfer to an output device.

8. A method of generating sound from wave tables stored in long term memory as claimed in claim 7 in which the step of transferring the portions to the sound generation controller for the generation of individual voices comprises transferring the portions in burst mode on the local bus, and storing the portions in a cache on the sound board for use by the sound generation controller.

* * * * *